US008896605B2

(12) United States Patent
Hao et al.

(10) Patent No.: US 8,896,605 B2
(45) Date of Patent: Nov. 25, 2014

(54) PROVIDING AN ELLIPSOID HAVING A CHARACTERISTIC BASED ON LOCAL CORRELATION OF ATTRIBUTES

(75) Inventors: Ming C. Hao, Palo Alto, CA (US); Umeshwar Dayal, Saratoga, CA (US); Daniel Keim, Steisslingen (DE); Halldór Janetzko, Constance (DE); Sabastian Mittelstadt, Constance (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 13/268,050

(22) Filed: Oct. 7, 2011

(65) Prior Publication Data

US 2013/0088493 A1    Apr. 11, 2013

(51) Int. Cl.
*G06T 11/20*    (2006.01)
(52) U.S. Cl.
CPC ................................. *G06T 11/203* (2013.01)
USPC ........................................................ 345/440
(58) Field of Classification Search
None
See application file for complete search history.

(56) References Cited

U.S. PATENT DOCUMENTS

| 6,937,238 | B2 * | 8/2005 | Hao et al. ........................ 345/440 |
| 7,256,799 | B2 * | 8/2007 | Hatanaka et al. .............. 345/629 |
| 2004/0183799 | A1 * | 9/2004 | Hao et al. ....................... 345/440 |
| 2007/0296863 | A1 * | 12/2007 | Hwang et al. .................. 348/563 |
| 2009/0043797 | A1 * | 2/2009 | Dorie et al. .................... 707/101 |
| 2010/0063496 | A1 | 3/2010 | Trovato |
| 2010/0072893 | A1 | 3/2010 | Eden |
| 2010/0231594 | A1 | 9/2010 | Hao |
| 2011/0221774 | A1 * | 9/2011 | Gallivan ........................ 345/635 |
| 2011/0242106 | A1 * | 10/2011 | Hao et al. ...................... 345/440 |

FOREIGN PATENT DOCUMENTS

| WO | WO9204701 | 3/1992 |
| WO | WO2010121085 | 10/2010 |

OTHER PUBLICATIONS

K-means Clustering via Principal Component Analysis Chirs Ding, Xiaofeng He. Appearing in Proceeding of the 21st International Conference on Machine Learning, Banff, Canada, 2004, copyright 2004 by the authors.*
Visual Analysis of Frequent Patterns in Large Time Series Hao et al IEEE Symposium on Visual Analytics Science and Technology Oct. 24, 2010.*
Nordenskjold, Coronary Artery Extraction from CT Images, Imea University, Apr. 2009 (47 pages).
Bresenham, Algorithm for Computer Control of a Digital Plotter, IBM Systems Journal, vol. 4, No. 1, 1965 (6 pages).

* cited by examiner

*Primary Examiner* — David Zarka
*Assistant Examiner* — Khoa Vu (57) ABSTRACT

Data records are grouped into clusters according to attributes of the data records to be correlated. At least two of the clusters that satisfy a proximity criterion are merged. At least one ellipsoid is created for presentation in a scatter plot visualization based on the grouping and merging, the ellipsoid including pixels representing multiple corresponding data records. The ellipsoid has a characteristic based on a corresponding local correlation of the attributes of the data records represented by the ellipsoid. The characteristic of the ellipsoid is adjusted based on a direction of the local correlation.

17 Claims, 7 Drawing Sheets
(4 of 7 Drawing Sheet(s) Filed in Color)

PROVIDING AN ELLIPSOID HAVING A CHARACTERISTIC BASED ON LOCAL CORRELATION OF ATTRIBUTES

BACKGROUND

Traditional scatter plots have been widely used to display correlation or association between two attributes (or variables) of data records. A scatter plot is a chart that uses Cartesian coordinates (e.g. x-axis or y-axis coordinates) to display values for the two attributes to be correlated. The data displayed in the scatter plot is a collection of points, each having one coordinate on the horizontal axis and one on the vertical axis.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

Figure 1:
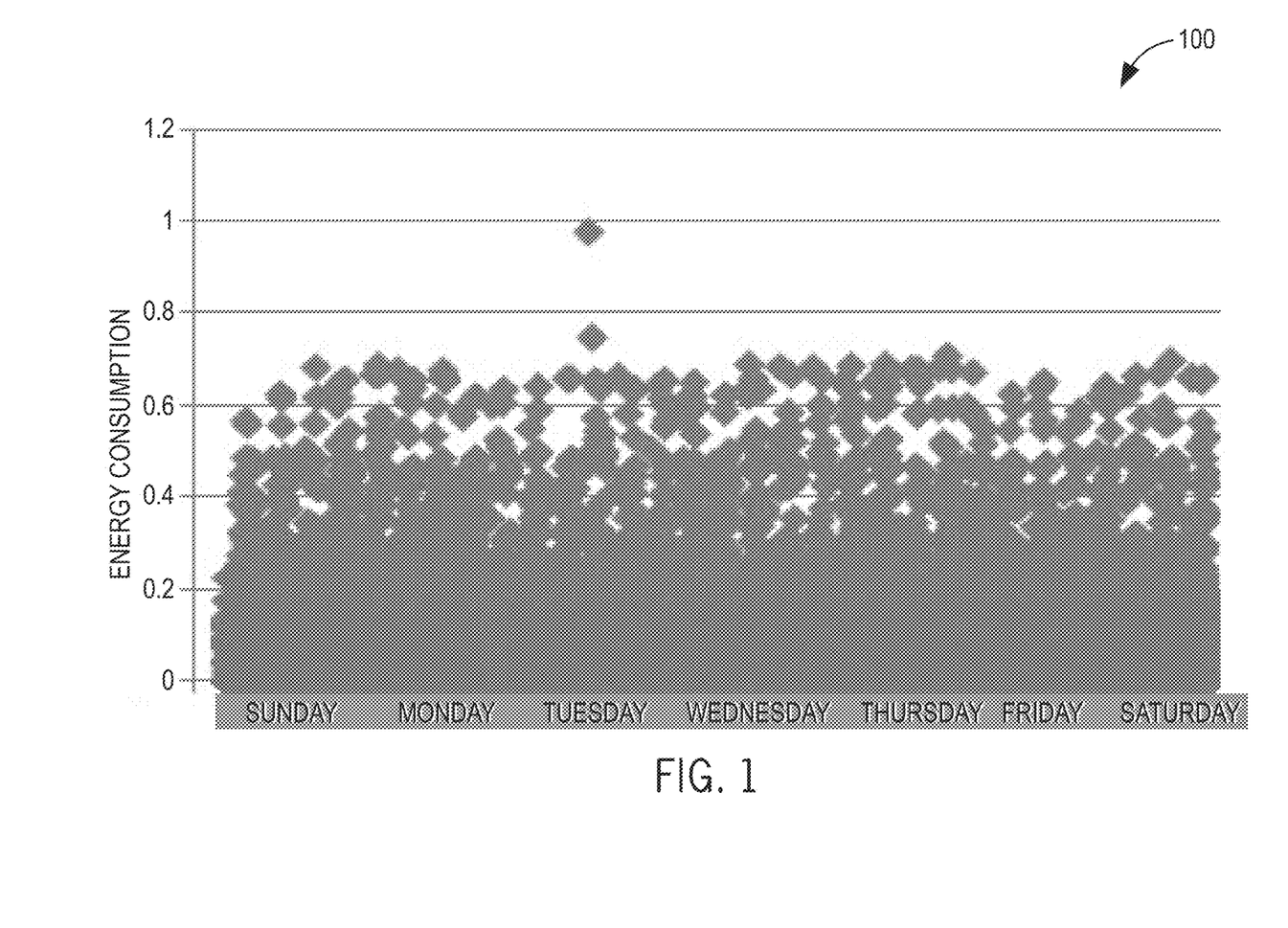
FIG. 1 illustrates an example scatter plot.

FIG. 1 illustrates an example scatter plot that includes pixels representing data records in a predefined time period, which can cover several months, as an example. The horizontal axis of the scatter plot 100 shown in FIG. 1 depicts time intervals, including Sunday, Monday, Tuesday, Wednesday, Thursday, Friday, and Saturday. The vertical axis of the scatter plot 100 depicts an example attribute (energy consumption) of the data records shown in the scatter plot 100. Thus, the scatter plot 100 plots energy consumption (on the vertical axis) with respect to time intervals Sunday-Saturday. More generally, a scatter plot is a chart that uses Cartesian coordinates (e.g. x-axis or y-axis coordinates) to display values for two attributes (energy consumption and time in the example of FIG. 1) that are to be correlated. A scatter plot can be used to visualize relationships between attributes of data records. Using a scatter plot, it can be easy to find how one attribute is affected by another attribute.

Each data record plotted in the scatter plot 100 has an x coordinate that corresponds to a time interval (one of Sunday-Saturday), and a y coordinate that corresponds to energy consumption (on the vertical axis). Note that the Sunday-Saturday time intervals are periodic time intervals, which are time intervals that repeat over time. Each time interval is a daily time interval that repeats every week. For data records in a period of several months, the data records having a time attribute with value "Monday" would be plotted in a portion of the scatter plot 100 corresponding to Monday, the data records having a time attribute with value "Tuesday" would be plotted in a portion of the scatter plot 100 corresponding to Tuesday, and so forth. Effectively, the example scatter plot 100 shows weekly energy usage over a period of several months.

As can be seen in FIG. 1, most of the pixels representing the data records are clumped together such that the pixels overlay each other, which results in occlusion of such pixels. As a result of occlusion, the scatter plot 100 shows a relatively small number of distinct data records, since a substantial portion of the pixels representing data records are not visible. Such occlusion of data records in the traditional scatter plot 100 prevents a user from performing meaningful analysis of the scatter plot 100, and can also hide the true extent of relationships between different attributes in the scatter plot 100.

A typical scatter plot, such as scatter plot 100, can show global trends in the correlated data attributes. However, a typical scatter plot does not allow for easy viewing of "local" correlations between attributes of data records. A "local" correlation between attributes of data records refers to a correlation that is present in a cluster of data records sharing common values or close values of the attributes that are being correlated. In an example for correlating a first attribute and a second attribute, a first cluster of data records may have first attribute values in a first range and second attribute values in a second range, while a second cluster data records may have first attribute values in a third range and second attribute values in a fourth range. These clusters of data records can exhibit respective local correlations between the first and second attributes.

Figure 2:
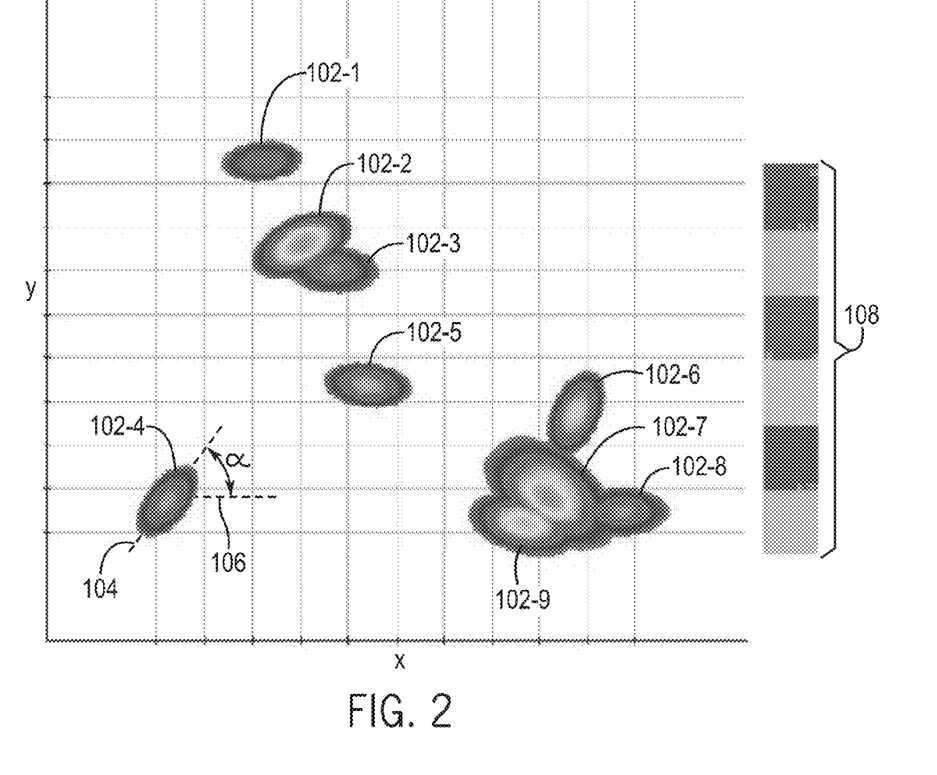
FIG. 2 is a scatter plot visualization depicting ellipsoids containing pixels representing data records, according to some implementations.

FIG. 2 shows several clusters of data records in a scatter plot visualization according to some implementations. The scatter plot visualization is displayed in a display device. The clusters are represented by ellipsoids 102-1, 102-2, 102-3, 102-4, 102-5, 102-6, 102-7, 102-8, and 102-9. An "ellipsoid" refers to a graphical structure that has an outer boundary that is generally shaped as an ellipse. An outer boundary "generally shaped as an ellipse" means that the outer boundary follows a contour that is generally elliptical in nature, even though there may be local deviations (e.g. juts, dips, etc.) that may make the boundary not follow a perfect elliptical shape. An ellipsoid according to some implementations contains pixels that represent corresponding data records in a respective cluster of data records. A "pixel" refers to a graphical element, which can be in the form of a dot or graphical structure of any other shape.

In examples according to FIG. 2, the attributes being correlated include attribute x and attribute y. In some implementations, each cluster includes data records that share a common x-y coordinate—in other words, the data records in a cluster have the same value of x and the same value of y. As explained further below, some of these clusters can be merged if certain conditions are satisfied. Merging of clusters causes a larger ellipsoid to be created.

As noted above, data records in the scatter plot visualization shown in FIG. 2 are represented by respective pixels. Each pixel has a visual indicator that is based on a value of a particular attribute (or group of attributes) of the corresponding data record. The visual indicator can be in the form of a color (such that different colors are assigned to corresponding different values of the corresponding attribute or attributes), a gray scale indicator (such that different grey scales are assigned to corresponding different values of the attribute or attributes), and so forth.

In FIG. 2, a color scale map 108 maps different values of a coloring attribute to respective different attributes. The color of a given pixel is based on the corresponding value of the coloring attribute of the data record represented by the given pixel.

Use of an ellipsoid allows for depiction of a local correlation between attributes of data records represented by the ellipsoid. To indicate such local correlation, a characteristic (or multiple characteristics) of the ellipsoid can be varied. The local correlation between attributes of the data records represented by the ellipsoid can be a positive correlation or a negative correlation. Stated differently, the local correlation has a direction of correlation, where the direction can be positive or negative. Alternatively, the local correlation between attributes of the data records represented by the ellipsoid can be associated with a strength—some local correlations between attributes can be a "stronger" correlation while other local correlations between attributes can be a "weaker" correlation. Positive correlation between a first attribute and a second attribute means that an increase in value of the first attribute leads to an increase in value of the second attribute, or a decrease in value of the first attribute leads to a decrease in value of the second attribute. Negative correlation between the first attribute and the second attribute means that an increase in value of the first attribute leads to a decrease in value of the second attribute, or a decrease in value of the first attribute leads to an increase in value of the second attribute.

A "stronger" correlation indicates that there is a relatively tight relationship, as specified by some correlation measure, between the first and second attributes. On the other hand, a "weaker" correlation refers to a loose relationship, as indicated by some correlation measure, of the first and second attributes.

The characteristic(s) of an ellipsoid that can be varied based on the type of correlation (positive versus negative correlation) and a strength of the correlation include(s) the following: a shape of the ellipsoid, and a rotation angle of the ellipsoid.

In some examples, the rotation angle of an ellipsoid can be measured between an axis that extends along the length dimension of the ellipsoid, and a predefined axis (e.g. horizontal axis or vertical axis or some other axis). Each ellipsoid has a length dimension and a width dimension, where the length dimension is along the length of the ellipsoid, which is larger than the width of the ellipsoid (where the width extends along the width dimension). In an example according to FIG. 2, the axis along the length dimension of the ellipsoid 102-4 in FIG. 2 is represented by dashed line 104, and the horizontal axis is represented by dashed line 106. The rotation angle of the ellipsoid 102-4 is represented by $\alpha$ in FIG. 2. The rotation angle of an ellipsoid is based on whether the local correlation is a positive correlation or a negative correlation, as explained further below. In other examples, the rotation angle of an ellipsoid can be measured between the width dimension of the ellipsoid and the horizontal or vertical axis.

The shape of an ellipsoid can be varied by changing the aspect ratio of the ellipsoid, where the aspect ratio refers to a ratio between the length and the width of the ellipsoid. In some implementations, the aspect ratio of an ellipsoid is based on the strength of correlation between attributes of the data records represented by the ellipsoid.

To avoid or reduce overlaying of pixels within each ellipsoid in FIG. 2, data records that share values of the correlated attributes can be processed to avoid or reduce the amount of overlap of pixels representing such data records. Upon detection of data records that share a particular pair of first attribute and second attribute values (in other words, the data records have common first and second attribute values, where the first and second attributes are the attributes being correlated), techniques or mechanisms according to some examples can place the pixels representing the data records that share the particular pair of first attribute and second attribute values in nearby positions according to similarity of values of a coloring attribute (or other attribute specifying a visual indicator to assign to pixels) to form a group of pixels having similar visual indicators (e.g. similar colors).

For example, in ellipsoid 102-2 in FIG. 2, orange pixels are grouped together, yellow pixels are grouped together around the group of orange pixels, green pixels are grouped together around the group of yellow pixels, and blue pixels are grouped together around the group of green pixels.

The grouping of pixels by values of the coloring attribute is accomplished by placing pixels with the same or similar coloring attribute values in "nearby" locations—in other words, such pixels are placed in such close proximity that a user can detect the grouping of the visual indicators (e.g. colors) of the pixels. Further details regarding a technique for avoiding or reducing overlay of pixels sharing common attribute values are provided in U.S. Ser. No. 12/381,716, "CONSTRUCTING A CELL-BASED CLUSTER OF DATA RECORDS OF A SCATTER PLOT," filed Mar. 16, 2009.

Figure 3A:
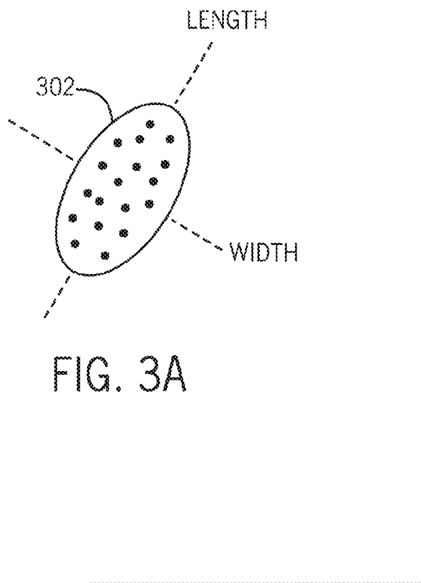
FIGS. 3A-3B illustrate example ellipsoids produced according to some implementations.
Figure 3B:
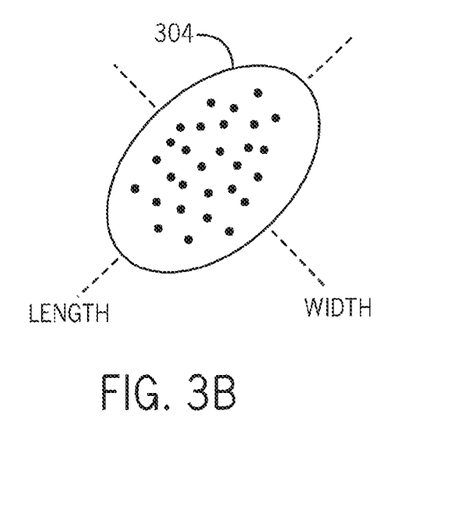

FIGS. 3A-3B illustrate two example ellipsoids 302 and 304, respectively. In each of FIGS. 3A and 3B, the dots (pixels) contained in each ellipsoid 302 or 304 represents corresponding data records. For each of the ellipsoids 302 and 304, a length dimension and a width dimension is depicted. Generally, the length dimension is perpendicular to the width dimension. Along the width dimension, the width of the ellipsoid (302 or 304) is determined by the widest part of the ellipsoid. Similarly, the length of the ellipsoid (302 or 304) is determined by the longest portion of the ellipsoid along the length dimension.

In some implementations, a stronger local correlation between attributes of data records is represented by a relatively narrow ellipsoid (such as ellipsoid 302 in FIG. 3A). On the other hand, a weaker correlation is represented by a wider ellipsoid (such as ellipsoid 304). The wider ellipsoid makes the ellipsoid look more circular (albeit a degenerated circle), which provides an indication that the attributes of the data records that are being correlated have weaker correlation.

Changing the width and/or length of an ellipsoid according to a strength of local correlation causes a change in the shape of the ellipsoid. In some examples, the change in shape is represented by a change in aspect ratio of the ellipsoid.

As noted above, another characteristic of an ellipsoid that can be varied based on the local correlation between attributes of data records represented by the ellipsoid is the rotation angle (a shown in FIG. 2) of the ellipsoid. A positive correlation is indicated by an angle $\alpha$ being between 0° and 90°, for example, such that the length dimension of the ellipsoid has a positive slope. In FIG. 2, ellipsoids 102-1, 102-2, 102-4, and 102-6 have positive correlations, and thus these ellipsoids have length dimensions with positive slope.

A negative correlation is indicated by an angle $\alpha$ being between 90° and 180° (or alternatively, between 270° and 360°), for example, such that the length dimension of the ellipsoid has a negative slope. In FIG. 2, ellipsoids 102-3, 102-5, 102-7, 102-8, and 102-9 have negative correlations, and thus these ellipsoids have length dimensions with negative slope.

Figure 4:
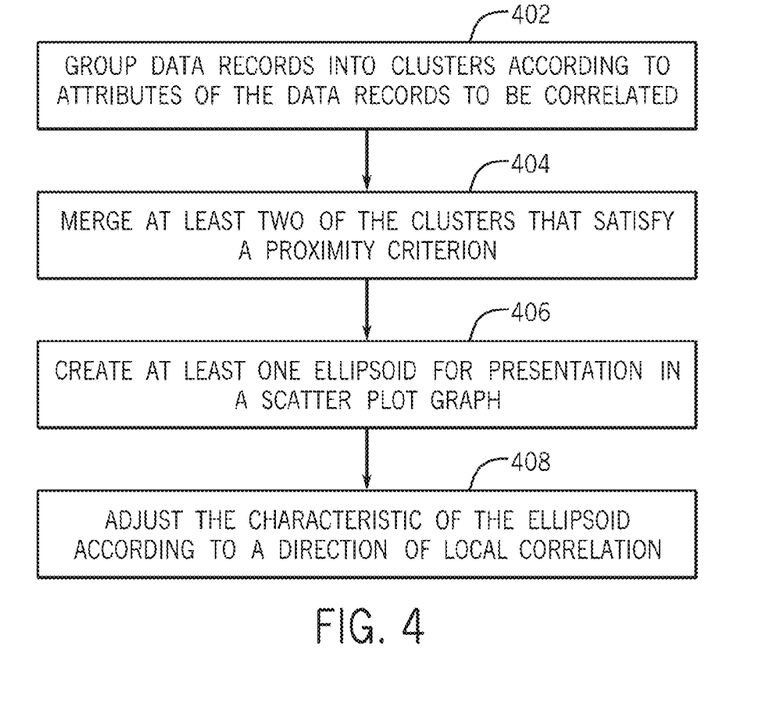
FIG. 4 is a flow diagram of a process of producing an ellipsoid for presentation in a scatter plot visualization according to some implementations.

FIG. 4 is a flow diagram of a process according to some implementations. The process groups (at 402) data records into clusters according to attributes of the data records to be correlated. The process then merges (at 404) at least two of the clusters that satisfy a proximity criterion. For example, overlapping clusters, adjacent clusters, or clusters within some predefined distance of each other, can be merged. Moreover, merging of clusters can further be based be based on a size criterion, where clusters each having a size less than a predefined size threshold can be merged.

Next, the process creates (at 406) at least one ellipsoid for presentation in a scatter plot graph, based on the grouping and merging. This scatter plot graph is for display in a visualization, such as the example scatter plot visualization of FIG. 2. The scatter plot graph is used for presenting correlations between the attributes (e.g. x and y attributes in FIG. 2) of the corresponding data records.

The process adjusts (at 408) a characteristic of the ellipsoid according to a direction of the local correlation of data records. Additionally, the process can adjust another characteristic of the ellipsoid based on a strength of the local correlation.

The grouping performed at 402 can be based on using a K-means clustering technique. A K-means clustering technique applies cluster analysis of data records within a data set to generate K clusters, where each data record belongs to the cluster with the nearest mean (which is represented by the centroid of the cluster). In other implementations, other clustering techniques can be used to cluster data records in a data set into respective clusters.

Figure 5A:
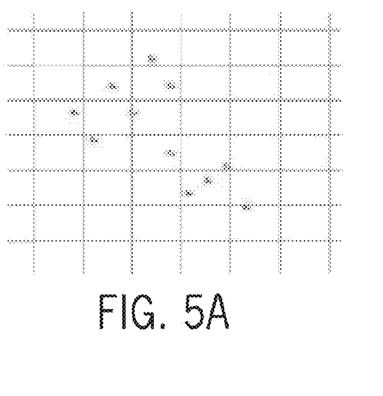
FIGS. 5A-5E are various graphs produced due to tasks according to some implementations.
Figure 5B:
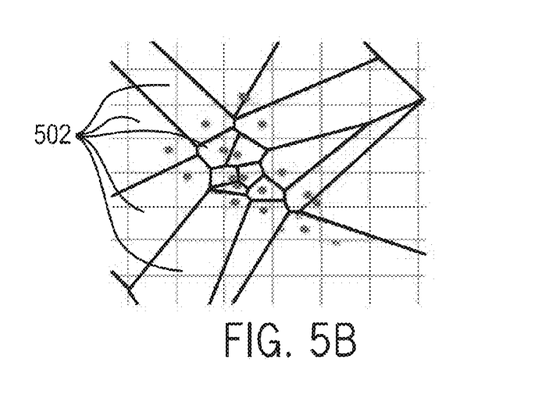

As shown in FIGS. 5A-5B, for example, pixels representing various data records (FIG. 5A) of a data set are processed using the K-means clustering technique to produce K clusters 502 (FIG. 5B). The darker dots shown in each cluster 502 of FIG. 5B represents the centroid of the respective cluster.

Since local correlations of attributes of the data records can vary over the entire data range associated with the data records in the data set, partitioning the data set into corresponding clusters allows for better identification of local correlations. In some implementations, the value of K for the K-means clustering technique can be set to a relatively large value.

Since K is initially set to a relatively large value, the merging that is performed at 404 in FIG. 4 allows for a reduction of the number of clusters. Effectively, the merging (404) causes nearby clusters to be merged, where the merged clusters result in a partition.

Figure 5C:
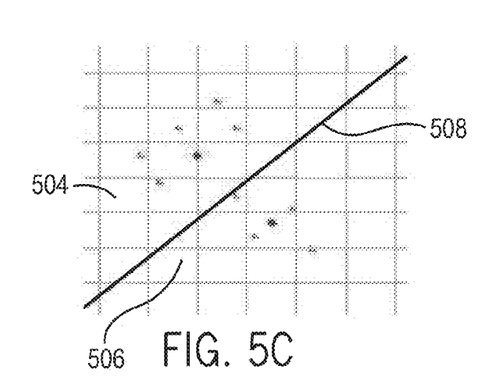

FIG. 5C shows merging of the clusters 502 of FIG. 5B into partitions 504 and 506, where the boundary between the partitions 504 and 506 is represented by a line 508. The larger dots in the partitions 504 and 506 represent respective centroids of the partitions 504 and 506.

Although reference is made to a "partition" as being a result of merging of multiple clusters, it is noted that a "partition" can also be considered a "cluster." Thus, reference to "cluster" herein can in some cases also refer to a partition.

Another example clustering technique that can be used is a hierarchical clustering technique, such as a linkage-based clustering technique that produces a cluster dendogram. A hierarchical clustering technique can be useful in cases where there are nested clusters, such as lower-level clusters that are within higher-level clusters.

After the partitioning that results from the grouping and merging (402 and 404 in FIG. 4), a local correlation between attributes in each of partitions 504 and 506 is determined. The direction and strength of the correlation for each partition 504 and 506 is calculated. In some implementations, the direction and strength of the correlation for each partition can be calculated by applying a Principal Component Analysis (PCA) technique to determine the most dominant local correlation. The PCA technique is a procedure that uses an orthogonal transformation to convert a set of observations (data records in this discussion) of possibly correlated attributes into a set of values of uncorrelated attributes that are referred to as principal components. The transformation is defined in such a way that the first principal component has as high a variance as possible, and each succeeding principal component in turn has the highest variance possible under the constraint that the succeeding component be orthogonal to (uncorrelated with) the preceding components.

Figure 5D:
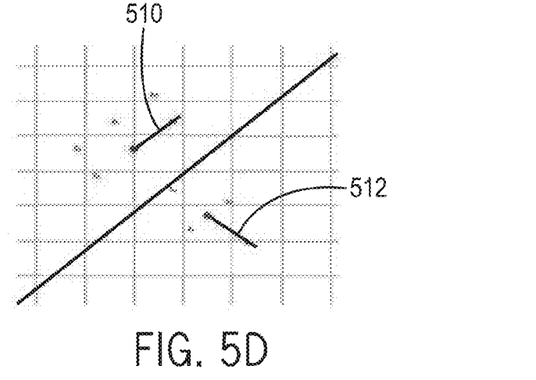

The result of the PCA technique provides two eigenvectors (directions of the local correlation) and two eigenvalues (strength of the local correlation). Note that the PCA technique results in two orthogonal eigenvectors that describe the distribution of points. One of the orthogonal eigenvectors describes the direction of the correlation, while the other eigenvector is just orthogonal to the former eigenvector. A representation of the eigenvector that represents the correlation direction for each of the partitions 504 and 508 is shown in FIG. 5D—in the partition 504, the representation of the respective eigenvector is indicated by 510, while in the partition 506, the representation of the respective eigenvector is indicated by 512. The length dimension of the ellipsoid that is to represent a corresponding one of the partitions 504 and 506 is arranged to be parallel with the direction of the respective eigenvector (as indicated by 510 or 512, respectively). The ratio of the length and width the respective ellipsoid is calculated by the ratio of the two eigenvalues for the respective partition.

Figure 5E:
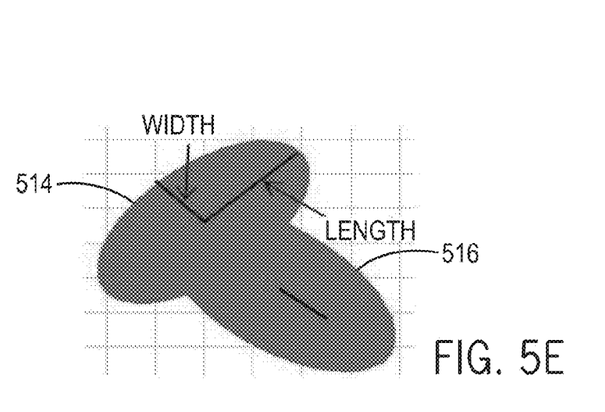

FIG. 5E shows an ellipsoid 514 to represent the partition 504, and an ellipsoid 516 to represent the partition 506. The length dimension of the ellipsoid 514 is generally parallel to the eigenvector represented by 510, and the length dimension of the ellipsoid 516 is generally parallel to the eigenvector represented by 512. As can be seen in the example according to FIGS. 5A-5E, use of the ellipsoids 514 and 516 allow for an enhancement of the visibility of the determined local correlations in each respective partition.

The orientation (as expressed by the rotation angle) and aspect ratio of the ellipsoid is used as an input to a modified Bresenham output technique that is configured to draw a rotated ellipsoid. The output of the Bresenham technique is processed through affine transformations for the rotation. The positions on the ellipsoid are then calculated, and it is checked whether the positions are still unoccupied and can be used for the relocation of overlapping pixels representing corresponding data records.

The basic Bresenham technique is described in J. Bresenham, "Algorithm for Computer Control of a Digital Plotter," IBM Systems Journal, Vol. 4, No. 1, pp. 25-30 (1965). A modification from the basic Bresenham technique as extended by affine transformation to allow for drawing a rotated ellipsoid is discussed below.

Pseudocode of the foregoing modified Bresenham technique is set forth below. Inputs to the pseudocode below include a length of the ellipsoid and the width of the ellipsoid to be drawn.

```
//Technique for ellipse plotting
1       Number dx =0, dy = width;
2       Number length2 = length * length;
3       Number width2 = width * width;
4       Number error = width2 - (2 * width - 1) * length2;
```

```
5      do
6          Point[ ] = p = {(dx,dy), (-dx,dy), (-dx, -dy), (dx, -dy)};
7          for i = 1 to 4
8              p[i].rotate(e.getOrientation( ));
9              p[i].translate(originalLocation);
10             if p[i] does not violate paint borders then
11                 resultPoints.add(p[i]);
12         next i
13         if 2 * error < (2 * dx + 1) * width2 then
14             dx++; error += (2 * dx + 1) * width2;
15         if 2 * error > -(2 * dy - 1) * lenght2 then
16             Dy--; error -= (2 * dy - 1) * length2;
17     while dy ≥ 0
18     return resultPoints.
```

Lines 1-4 of the pseudocode above define various constants to be used, based on the length and width of the ellipsoid. Line 6 of the pseudocode defines an array Point[ ] in a manner to make computations easier by calculating just a quarter of an ellipsoid, with the remaining three quarters of the ellipsoid derived by mirroring the calculated quarter.

At line 8, the rotate( ) function rotates a pixel, p[i], around the point (0,0) and then translates (moves) the ellipsoid points to the origin (originalLocation). At line 9, the translate( ) function repositions a pixel, where a translation of a pixel at coordinate (x1, y1) by a translation offset (trans) is represented as (x1+trans, y1+trans). Lines 9-10 of the pseudocode specifies that if the rotated and translated pixel is not outside a predefined painting rectangle ("paint borders" in the pseudocode), then the pixel p[i] is added to a result data structure, resultPoints. The reason for performing the "if" validation at line 9 is that pixels are not placed outside the predefined painting rectangle ("paint borders").

Lines 13-16 of the pseudocode specify that the process proceeds around the ellipsoid (e.g. starting at 12 o'clock and going clockwise) and decide for each pixel whether the process is to paint the pixel to the east or the southeast. To decide this, there exists one decision variable ("error") which has to satisfy the predefined criteria to indicate which pixel to paint next. At lines 13-16 of the pseudocode, dx and dy represent the current pixel position.

Figure 6:
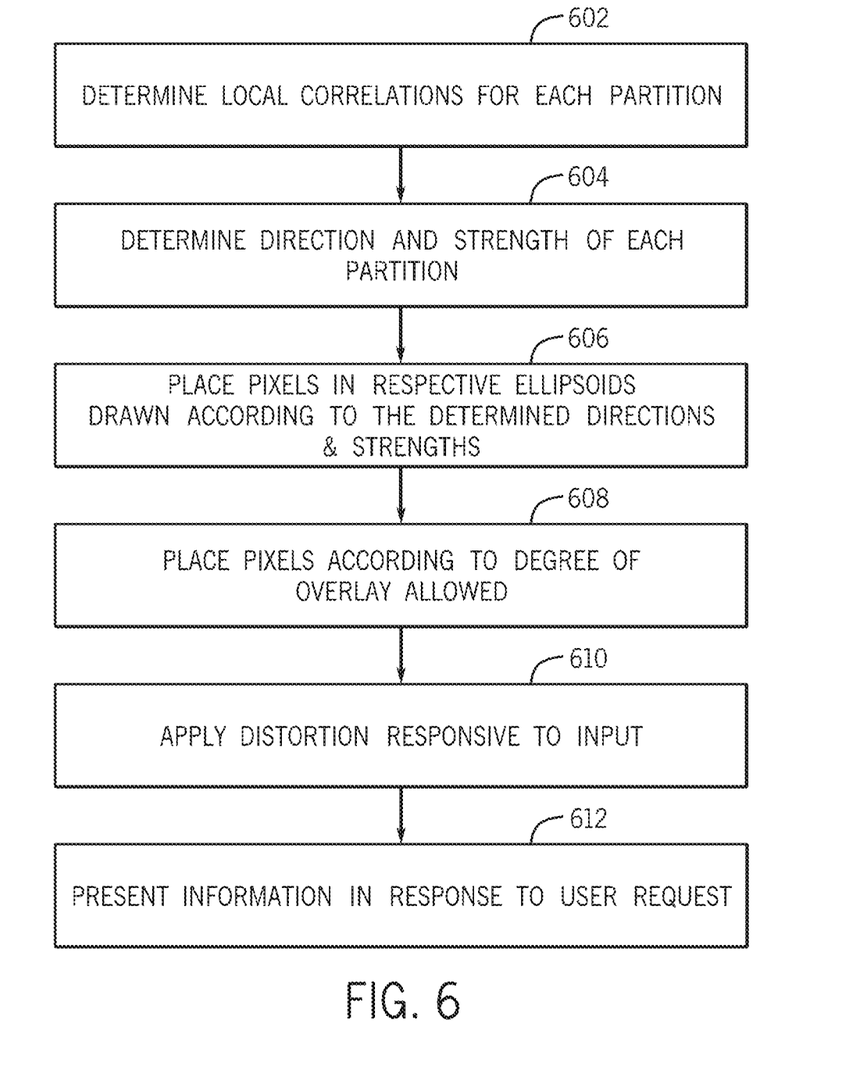
FIG. 6 is a flow diagram of a process according to alternative implementations.

FIG. 6 is a flow diagram of a process according to alternative implementations. FIG. 6 assumes that tasks 402 and 404 of FIG. 4 have been performed, such that partitions have been identified (e.g. partitions 504 and 506 in FIG. 5C). The process of FIG. 6 determines (at 602) local correlations for each partition, such as by using the PCA technique discussed above. Next, the process determines (at 604) a direction and strength of each partition, as indicated by the eigenvectors and eigenvalues resulting from the PCA technique.

After the direction and strength of the local correlation for each partition is determined, the pixels of corresponding data records are placed (at 606) in respective ellipsoids, as shown in FIG. 5E, which shows a first ellipsoid 514 corresponding to the partition 504, and a second ellipsoid 516 corresponding to the second partition 506.

The process of FIG. 6 also places (at 608) pixels according to a degree of overlay of pixels allowed (as specified by user input, for example). In addition, the process can apply distortion (at 610) to a particular axis of the scatter plot graph (as specified by user input, for example). Tasks 608 and 610 are discussed further in connection with FIG. 7B.

The process of FIG. 6 also can present (at 612) information in response to user request. For example, a user can move a cursor (with an input device such as a mouse) over a particular pixel in the scatter plot graph, and detailed information pertaining to the pixel (e.g. information regarding values of attributes) can be presented in a pop-up box.

Figures 7A, 7B:
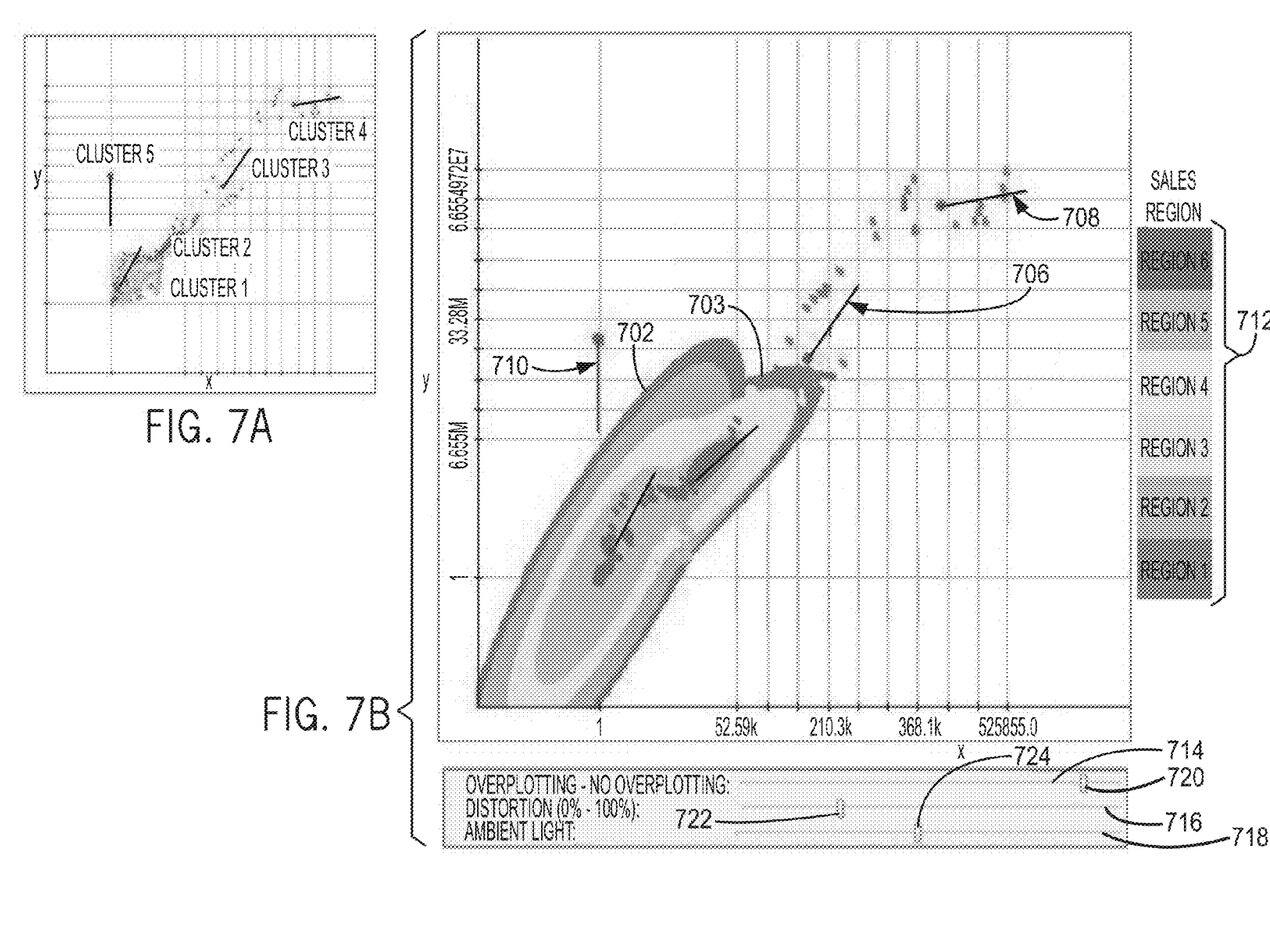
FIG. 7A is a scatter plot graph of clusters of data records according to some examples.
FIG. 7B is a scatter plot visualization including ellipsoids containing pixels representing data records in corresponding clusters, produced according to some implementations.

FIG. 7A shows a scatter plot graph for correlating attributes x and y. In FIG. 7A, 5 clusters (or partitions) are identified, such as by use of the grouping and merging tasks discussed in connection with FIG. 4.

FIG. 7B shows a result based on application of techniques according to some implementations, as discussed above. In FIG. 7B, two ellipsoids 702 and 703 are drawn for clusters 1 and 2. However, insufficient data records are present in clusters 3, 4, and 5, and thus, no ellipsoids have been drawn for those clusters, as represented by 706, 708, and 710 in FIG. 7B. A color scale map 712 is shown in FIG. 7B, which correlates colors to different values of a coloring attribute (which in the example of FIG. 7B is "sales region").

FIG. 7B also shows user-adjustable control elements 714, 716, and 718. The user-adjustable control elements 714 (which has a slidable control icon 720) is used for defining how much overlay (overplotting) is allowed for pixels in a scatter plot graph, such as that shown in FIG. 7B. Moving the control icon 720 to the right indicates that less overlay is to be applied, while moving the control icon to the left indicates more overlay of pixels is allowed. As shown in FIG. 6, pixels are placed (at 608) in the scatter plot graph according to the degree of overlay allowed, based on user input (e.g. adjustment of the control icon 720).

The control element 716 has a slidable control icon 722 that is movable left or right to control an amount of distortion of one of the axes of the scatter plot graph. For example, the control icon 722 can be moved to the right to apply greater distortion, where distortion of an axis, such as the x axis shown in FIG. 7B, causes the axis to become non-linear in terms of scale. As shown in FIG. 6, distortion is applied (at 610) in response to user input (e.g. adjustment of the control icon 722).

The control element 718 also includes a slidable control icon 724 that is movable left and right to control the amount of "ambient light" of the pixels depicted in the scatter plot graph. Ambient light of the pixels refers to the amount of shading of the pixels, for indicating an age of the corresponding data record, for example.

Figure 8:
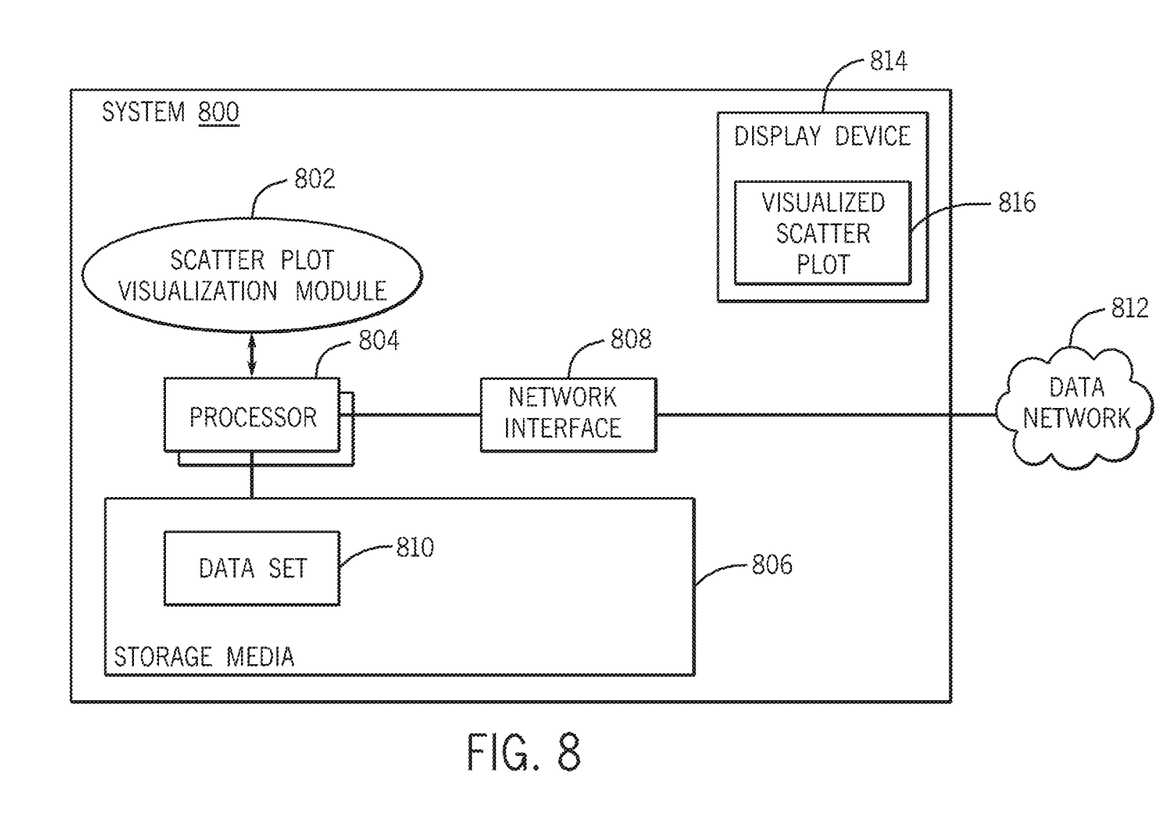
FIG. 8 is a block diagram of an example system incorporating some implementations.

FIG. 8 is a block diagram of an example system 800 that has a scatter plot visualization module 802 according to some implementations. The scatter plot visualization module 802 can perform various tasks discussed above, including those described in connection with FIGS. 4 and/or 6. The scatter plot visualization module 802 can also be used to produce scatter plot visualizations, such as those shown in FIG. 2 or 7B.

The scatter plot visualization module 802 can be implemented as machine-readable instructions executable on one or multiple processors 804. The processor(s) 804 can be connected to a storage medium (or storage media) 806 and to a network interface 808. A processor can include a microprocessor, microcontroller, processor module or subsystem, programmable integrated circuit, programmable gate array, or another control or computing device. The storage medium 806 can store a data set 810 that has been received by the system 800.

The storage medium 806 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
grouping, by a system having a processor, data records into clusters according to attributes of the data records, the attributes to be correlated;
merging, by the system, at least two clusters that satisfy a proximity criterion;
creating, by the system, at least one ellipsoid for presentation in a scatter plot visualization based on the grouping and merging, the ellipsoid including pixels representing multiple corresponding data records, wherein the ellipsoid has a rotation angle that is based on a corresponding local correlation of the attributes of the data records represented by the ellipsoid; and
adjusting the rotation angle of the ellipsoid based on whether the local correlation is a positive correlation or a negative correlation, wherein a first rotation angle of the ellipsoid corresponding to the positive correlation results in a dimension of the ellipsoid having a positive slope, and wherein a second rotation angle of the ellipsoid corresponding to the negative correlation results in a dimension of the ellipsoid having a negative slope.

2. The method of claim 1, further comprising adjusting a characteristic of the ellipsoid based on a strength of the local correlation.

3. The method of claim 2, wherein adjusting the characteristic of the ellipsoid comprises adjusting an aspect ratio of the ellipsoid based on the strength of the local correlation.

4. The method of claim 1, wherein the scatter plot visualization correlates a first attribute to a second attribute, and wherein each of the clusters has data records sharing a respective value of the first attribute and value of the second attribute.

5. The method of claim 1, wherein the grouping comprises applying K-means clustering to produce K clusters, where K is greater than one.

6. The method of claim 1, wherein the merging based on the proximity criterion comprises merging based on the proximity criterion that merges clusters that overlap, or that merges adjacent clusters, or that merges clusters within some predefined distance of each other, and wherein the merging is further based on a size criterion that relates to sizes of the clusters.

7. The method of claim 1, further comprising:
applying distortion to an axis of the scatter plot visualization to place pixels for forming the ellipsoid.

8. The method of claim 2, further comprising determining a direction and the strength of the local correlation based on application of a principal component analysis (PCA) technique.

9. An article comprising at least one non-transitory storage medium storing instructions that upon execution cause a system to:
group data records into clusters according to attributes of the data records, the attributes to be correlated;
merge the clusters based on a proximity criterion to produce corresponding partitions, wherein a number of the partitions is less than a number of the clusters;
create ellipsoids that represent corresponding ones of the partitions for presentation in a scatter plot visualization; and
adjust respective characteristics of the ellipsoids dependent upon corresponding local correlations between the attributes of the data records represented by corresponding ones of the partitions, wherein the adjusting comprises adjusting a rotation angle of a particular one of the ellipsoids based on whether the corresponding local correlation is a positive correlation or a negative correlation, wherein a first rotation angle of the particular ellipsoid corresponding to the positive correlation results in a dimension of the particular ellipsoid having a positive slope, and wherein a second rotation angle of the particular ellipsoid corresponding to the negative correlation results in a dimension of the particular ellipsoid having a negative slope.

10. The article of claim 9, wherein the characteristics comprise a shape of a corresponding ellipsoid and a slope of a dimension of the corresponding ellipsoid.

11. The article of claim 10, wherein the instructions upon execution cause the system to further:
vary the shape of the corresponding ellipsoid based on a strength of the local correlation of the respective one of the partitions.

12. The article of claim 9, wherein each of the ellipsoids contains pixels representing corresponding ones of the data records, and where the pixels are assigned colors according to a coloring attribute of the corresponding data records.

13. The article of claim 9, wherein the instructions upon execution cause the system to further:
for each of the partitions, determine a direction and strength of the corresponding local correlation.

14. A system comprising:
at least one storage medium to store data records; and
at least one processor to:
group the data records into clusters according to attributes of the data records, the attributes to be correlated;
merge at least two clusters that satisfy a proximity criterion;
create at least one ellipsoid for presentation in a scatter plot visualization based on the grouping and merging, the ellipsoid including pixels representing multiple corresponding data records, wherein the ellipsoid has characteristics that are based on a corresponding local correlation of the attributes of the data records represented by the ellipsoid; and
adjust at least one of the characteristics of the ellipsoid based on a direction of the local correlation, wherein adjusting at least one of the characteristics of the ellipsoid comprises adjusting a rotation angle of the ellipsoid based on whether the local correlation is a positive correlation or a negative correlation, wherein a first rotation angle of the ellipsoid corresponding to the positive correlation results in a dimension of the ellipsoid having a positive slope, and wherein a second rotation angle of the ellipsoid corresponding to the negative correlation results in a dimension of the ellipsoid having a negative slope.

15. The system of claim 14, wherein the characteristics include a shape of the ellipsoid and a rotation angle of the ellipsoid, the shape being based on a strength of the local correlation, and the rotation angle being based on the direction of the local correlation.

16. The system of claim 14, wherein the ellipsoid includes pixels representing corresponding data records, the pixels having colors assigned based on values of a coloring attribute of the data records.

17. The method of claim 1, wherein the merging is performed after the grouping.

* * * * *